United States Patent [19]

Takahama et al.

[11] Patent Number: 5,364,823
[45] Date of Patent: Nov. 15, 1994

[54] METHOD FOR MANUFACTURING INORGANIC POROUS LAYERED MEMBER

[75] Inventors: Koichi Takahama; Shozo Hirao; Masaru Yokoyama; Takashi Kishimoto; Hiroshi Yokokawa, all of Osaka, Japan

[73] Assignee: Matsushita Electric Works, Ltd., Osaka, Japan

[21] Appl. No.: 93,496

[22] PCT Filed: May 19, 1987

[86] PCT No.: PCT/JP87/00317

§ 371 Date: Jul. 17, 1987

§ 102(e) Date: Jul. 17, 1987

[87] PCT Pub. No.: WO88/02356

PCT Pub. Date: Jul. 4, 1988

[30] Foreign Application Priority Data

Sep. 25, 1986 [JP] Japan ................................ 61-227221

[51] Int. Cl.⁵ .................... B01J 21/16; B01J 20/12
[52] U.S. Cl. .............................. 502/62; 252/378 R; 423/118.1; 501/148; 502/63; 502/80; 502/84
[58] Field of Search ............. 264/63; 423/328, 327, 423/118; 252/378 R; 502/62, 63, 80, 84; 501/148

[56] References Cited

U.S. PATENT DOCUMENTS 4,176,090 11/1979 Vaughan et al. ............... 252/455 Z
4,248,739 2/1981 Vaughan et al. ................. 252/455
4,271,043 6/1981 Vaughan et al. ................. 252/455
4,629,713 12/1986 Suzuki et al. ...................... 502/84
4,631,091 12/1986 Goodman ........................ 501/148

FOREIGN PATENT DOCUMENTS 0150897 7/1985 European Pat. Off.
54-5884 1/1979 Japan.
54-16386 2/1979 Japan.
60-131878 7/1985 Japan.
60-137812 7/1985 Japan.

Primary Examiner—James Derrington
Attorney, Agent, or Firm—Burns, Doane, Swecker & Mathis

[57] ABSTRACT

This invention relates to a method for manufacturing an inorganic porous layered member which can maintain a sufficient distance between layers to show a high degree of heat insulating properties. In the manufacturing method for the inorganic porous layered member according to the present invention, an inorganic layered compound 12 having swelling charecteristics is swelled, and an inorganic pillar and an organic pillar are intercalated to form inorganic compound 16 between layers 14 of the inorganic layered compound 12. Fine gaps are thus formed in a wide range by the intercalation of the inorganic compound 16 between the layers 14 to maintain a sufficient distance between the layers 14, and the inorganic porous layered member 10 having high heat insulating properties is thus produced.

34 Claims, 2 Drawing Sheets

METHOD FOR MANUFACTURING INORGANIC POROUS LAYERED MEMBER

FIELD OF THE INVENTION

This invention relates to a method for manufacturing inorganic porous layered members and, more particularly, to a manufacturing method for an inorganic porous layered member which shows high heat insulation properties by having been calcined with a sufficient distance retained between respective layers.

BACKGROUND OF THE INVENTION

As layered compounds which form a porous layered member, in general, there may be enumerated such intercalation substances as have been disclosed in, for example, Japanese Patent Application Laid-Open Publications Nos. 54-5884 and 54-16386, in which a foreign substance such as hydroxide or the like is intercalated for reaction between respective layers of a layered compound showing swelling characteristics. In these intercalation substances, however, there remains a problem that, in practice, the distance between the layers is so small as to be less than 10Å so that the substances will be easily affected by adsorbed water and heat insulation properties at any satisfactory level cannot be achieved.

On the other hand, there have been disclosed in, for example, Japanese Patent Application Laid-Open Publications Nos. 60-131,878 and 60-137,812 porous layered members that are obtained by using a water-soluble high polymer and a finely porous smectite-type clay which are mixed to introduce polymer between clay layers, and then intercalating a cation is oxide or polymeric silica. In these porous layered members, the distance between the layers can be expanded to an extent of 30Å, but still there remains the problem that no sufficient distance for reducing or eliminating the influence of adsorbed water can be ensured between the layers.

SUMMARY OF THE INVENTION

Accordingly, the object of the present invention is to provide a method for manufacturing an inorganic porous layered member in which the distance between the layers can be made sufficiently large, and which can be provided with high heat insulation properties by a calcination treatment during the manufacturing steps.

The above object can be attained by providing a method for manufacturing the inorganic porous layered member, which method being characterized in that a layered compound showing swelling characteristics is subjected to a swelling, and inorganic and organic pillars are intercalated between layers of the layered compound, dried and calcined so as to from fine gaps between the layers of the layered compound.

DETAILED DESCRIPTION OF PREFERRED EMBODIMENTS ACCORDING TO THE INVENTION

Figure 1:
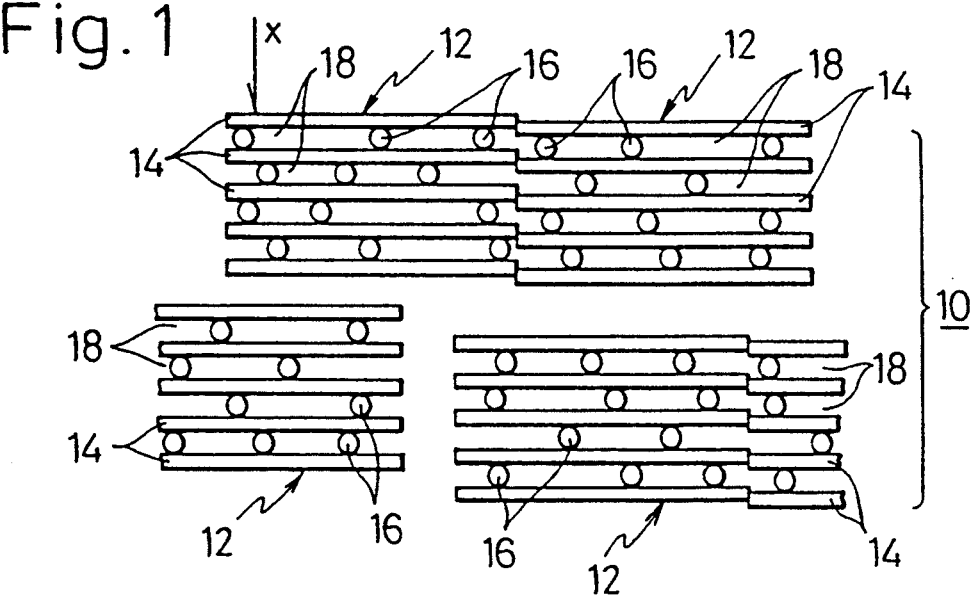
FIG. 1 is a schematic view of the inorganic porous layered member produced according to method of the present invention.

Referring to FIG. 1, the structure of an inorganic porous layered member 10 obtained according to the manufacturing method of the present invention is schematically shown, and this porous member 10 comprises many pieces of inorganic layered compound 12 obtained by causing a swellable inorganic layered compound to swell. An inorganic compound 16 is intercalated and fixed between the respective layers 14 of the inorganic layered compound 12, and gaps 18 between the layers 14 are caused to be 30 to 600 Å with the interposition of the inorganic compound 16 between the layers 14.

For the inorganic layered compound 12, any one showing swelling characteristics may be employed, but it is optimum to use in particular Na-montmorillonite, Ca-montmorillonite, acid clay, 3-octahedron synthetic smectite, Na-hectorite, Li-hectorite, Na-taeniolite, Li-taeniolite and Na-Fluoro-Tetrasilicmica. It is required to perform a kneading in any well known manner to reflect the swelling, when a swelling inorganic layered compound such as Ca-montmorillonite, acid clay and the like is used, which do not swell without a strong shearing force applied thereto.

For the inorganic pillar forming the inorganic compound 16, at least one of (1) a polymeric substance obtained by hydrolyzing a metallic alcoholate (which metallic alcoholate for obtaining the polymer through hydrolysis shall be hereinafter referred to as "metallic alcoholate A" in order to distinguish it from any other metallic alcoholates) and (2) a colloidal inorganic compound is employed. For the metallic alcoholate A, one or more of $Si(OR)_4$, $Al(OR)_3$, $Ge(OR)_4$ and the like alone or admixed may be used, or such compounds as $Si(OC_2H_5)_4$, $Si(OCH_3)_4$ $Ge(OC_3H_7)$, $Ge(OC_2H_5)_4$ or their equivalents may be used. The metallic alcoholate A becomes through hydrolysis such a polymer that forms the inorganic pillar. For the colloidal inorganic compound, while not intended to particularly restrict, one or more of, for example, $SiO_2$, $Sb_2O_3$, $Fe_2O_3$, $Al_2O_3$, $TiO_2$, $ZrO_2$ and $SnO_2$ alone or mixed may be employed. While it is not intended to particularly limit, further, the grain size of this compound should preferably be in a range of about 50 to 150 Å.

While it may be a possible measure to intercalate and fix the foregoing inorganic pillar in an unmodified state between the respective layers 14 of the swelling inorganic layered compound 12, the inorganic pillar is preferably to be intercalated between the layers 14 after being modified at the surface by at least one of (1) a cationic inorganic compound and (2) a metallic alcoholate different than the metallic alcoholate A described above (the former shall be referred to hereinafter as "metallic alcoholate B" to be distinguished from the metallic alcoholate A). For the cationic inorganic compound employed for the surface modification of the inorganic pillar, titanium compounds, zirconium compounds, hafnium compounds, iron compounds, copper compounds, chromium compounds, nickel compounds, zinc compounds, aluminum compounds, manganese compounds, phosphorus compounds, boron compounds and their equivalents may be enumerated, and in particular such metallic chlorides as $TiCl_4$ and the like, such metallic oxychlorides as $ZrCOCl_2$ and the like, or a nitrate chloride, and their equivalents, may be used.

For the metallic alcoholate B, on the other hand, one or more of $Ti(OR)_4$, $Zr(OR)_4$, $PO(OR)_3$, $B(OR)_3$ and the like alone or mixed may be used, and, as particular examples, $Ti(OC_3H_7)_4$, $Zr(OC_3H_7)_4$, $PO(OCH_3)_3$, $PO(OC_2H_5)_3$, $B(OCH_3)_3$, $B(OC_2H_5)_3$ or their equivalents may be used.

Between the layers 14 of the inorganic layered compound 12, an organic pillar is intercalated together with the pillar of the inorganic compound 16. For the organic pillar, at least one of water-soluble high polymers, quarternary ammonium salts, amphoteric surface-active agents and choline compounds is used. For the water-soluble high polymer, it is optimum to use, for example, polyvinyl alcohol, polyethylene glycol, polyethylene oxide, methyl cellulose, carboxymethyl cellulose, polyacrylic acid, polyacrylic soda, polyvinyl pyrrolidone and their equivalents.

For the quarternary ammonium salts (cationic surface-active agent), octadecyl group, hexadecyl group, tetradecyl group, dodecyl group and their equivalent groups may be enumerated and, more concretely, it may be possible to employ a compound of octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt, ditetradecyl dimethyl ammonium salt and their equivalents.

As the amphoteric surface-active agent, it will be optimum to employ one which is of the aliphatic amine type at the cationic part and has at the anionic part at least one group selected from a group consisting of carboxyl group, sulfate group, sulfone group and phosphate group. As the choline compound, for example, $[HOCH_2CH_2N(CH_3)_3]_+OH^-$, $C_5H_{14}ClNO$, $C_5H_{14}NOC_4H_5O_6$, $C_5H_{14}NOC_6H_7O_7$, $C_5H_{14}NOC_6H_{12}O_7$ and their equivalents may be enumerated.

In this case, it should be appreciated that, with respect to the water-soluble high polymer, quarternary ammonium salt, amphoteric surface-active agent and choline compound, any other substance than the foregoing compounds can be employed as the organic pillar, so long as it can be present between the respective layers 14 of the inorganic layered compound 12 and become vaporized upon calcination to leave gaps between the layers' and can be mixed with the inorganic pillar.

Figure 2:
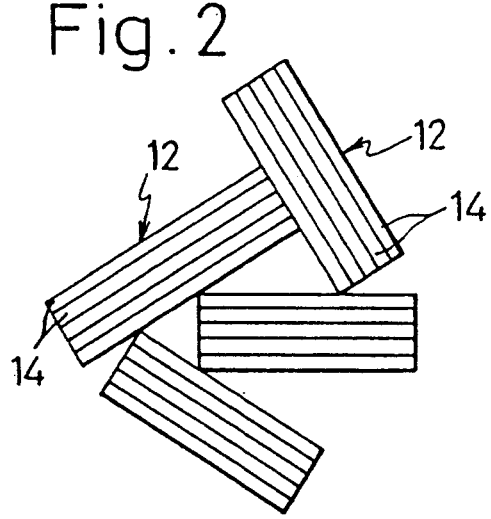
FIG. 2 is a schematic view of the layered compound showing the swelling characteristics which forms a base material of the inorganic porous layered member of FIG. 1.
Figure 3:
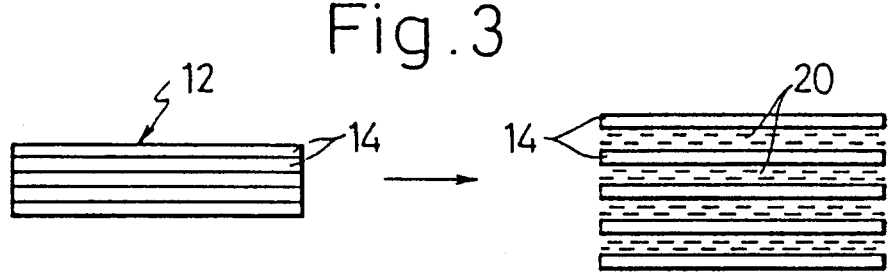
FIG. 3 is an explanatory view showing the swelling step in the method of manufacturing the inorganic porous layered member according to the present invention.

The manufacturing method of the inorganic porous layered member 10 as shown in FIG. 1 shall be explained next. The swellable inorganic layered compound 12 which is the base material of the inorganic porous layered member 10 is a substance such as swellable clay mineral. In the present instance, the inorganic layered compound 12 shown in FIG. 2 and forming, for example, the swelling clay mineral is mixed or kneaded as required with a solvent such as water, and is initially made to swell with the solvent 20 caused to be present between the layers 14 of the inorganic layered compound 12 as shown in FIG. 3. While water can be optimally employed as the solvent in general since it easily swells the inorganic layered compound, one of such polar solvents as methyl alcohol, DMF, DMSO and their equivalents or two or more of them in admixture may also be employed.

Figure 5:
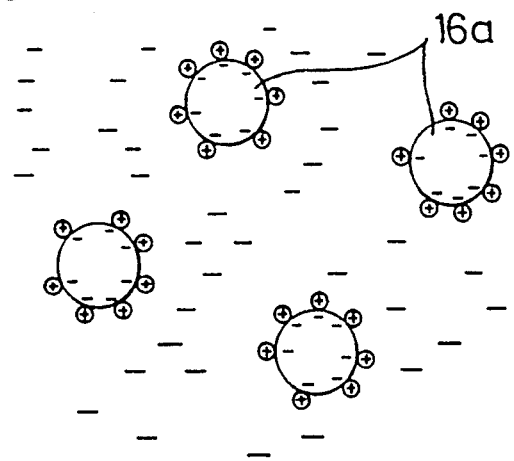
FIG. 5 is an explanatory view of a reaction product of the inorganic pillar after having been surface-modified for use in the manufacturing method of the present invention.
Figure 6:
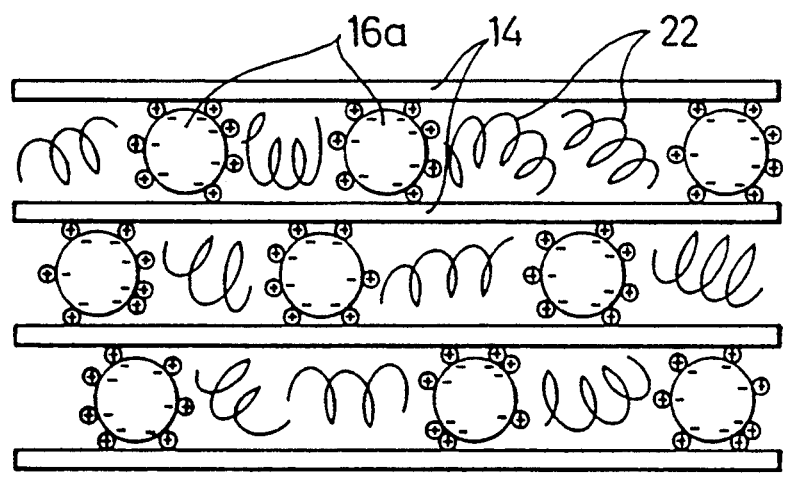
FIG. 6 is an explanatory view of the step of intercalating the reaction product of FIG. 5 together with the organic pillar between the layers of the swelling layered compound in the manufacturing method of the present invention.

Then the metallic alcoholate A is solved by adding to this substance forming the inorganic compound 16, such a solvent as, when in particular a polymeric substance of the metallic alcoholate A is employed, ethyl alcohol, isopropyl alcohol and the like. Thereafter, a reaction catalyst, that is, a hydrolytic catalyst such as water, hydrochloric acid and the like is added and mixed therewith, and a hydrolytic reaction is performed preferably at a temperature of about 70° C. Further, at a stage where the hydrolytic reaction has developed to a certain extent and cores have grown, the metallic alcoholate B or cationic inorganic compound is added to this reactionary solution, and these modifier compounds are caused to additionally react upon the hydrolyzed core surface, whereby the inorganic pillar reaction product 16a is formed, in which the surface is positively charged or has its negative charge cancelled as shown in FIG. 5 can be obtained.

Figure 4:
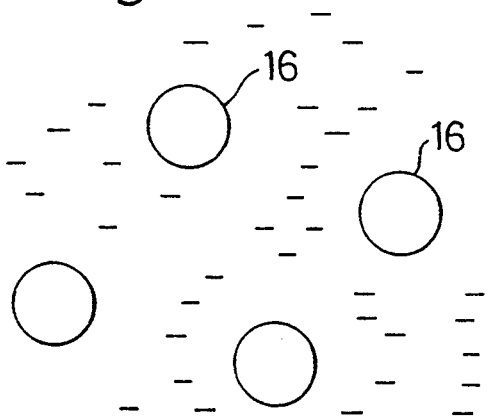
FIG. 4 is an explanatory view of the inorganic pillar formed from a colloidal inorganic compound or hydrolyzed metallic alcoholate, that is employed in the manufacturing method of the present invention.

In an event where colloidal inorganic compound as shown in FIG. 4 is used as the inorganic pillar forming the inorganic compound 16, the metallic alcoholate B or cationic inorganic compound is added to a dispersion of the colloidal inorganic compound. These modifier compounds are in this case caused to additionally react upon the surface of the colloidal inorganic compound, and the inorganic pillar reaction product 16a as shown in FIG. 5 is obtained, which is intercalated and fixed between the layers 14.

Next, the inorganic pillar, that is, the inorganic compound 16 or the inorganic pillar reaction product 16a, is mixed with the inorganic layered compound 12 which has been preliminarily swelled in the step shown in FIG. 3 and is inserted, that is, subjected to the intercalation, preferably at a temperature of about 60° to 70° C. If an organic pillar such as the water-soluble high polymer, quarternary ammonium salt, amphoteric surface-active agent or choline compound is added, this organic pillar 22 acts to expand between the layers 14 of the inorganic layered compound 12. The addition of the organic pillar 22 causes the inorganic pillar reaction product 16a between the layers 14 to be rejarded in its movement and to stay between the layers 14, and the inorganic pillar reaction product 16a thus immobilized between the layers 14 act to expand between the layers 14.

Thereafter, the reaction medium in which the inorganic pillar reaction product 16a and organic pillar 22 are mixed with the swelling inorganic layered compound 12 is dehydrated by means of a centrifugal separation. The residual inorganic layered compound 12 is then orientated by a spatula or the like into a sheet shape, the sheet-shaped inorganic layered compound 12 is dried by means of a warm-air drying at a temperature of about 60° C., and is then calcined by heating to 300° to 600° C., preferably 450° to 55° C. With this calcination, a very small amount of organic substance of the organic pillar 22 or the like is transformed into $CO_2$, $NO_2$, $H_2O$ and the like to be removed, and a sheet-shaped inorganic porous layered member as shown in FIG. 1, having the inorganic compound 16 intercalated and fixed between the layers' is obtained.

It has been found that the inorganic porous layered member 10 thus prepared retains an interval of 30 to 600Å between the respective layers 14 in more than 40% of the whole of the member, and is excellent in heat insulation properties particularly in the direction of the arrow X shown in FIG. 1. While in the foregoing explanation the organic pillar has been referred to as being intercalated between the layers 14 in the swelling inorganic layered compound 12 simultaneously with the inorganic pillar, the inorganic and organic pillars may be caused to be intercalated between the layers 14 respectively individually.

Specific examples of the method for manufacturing the inorganic porous layered member according to the present invention as well as comparative examples for comparison with the former examples shall be disclosed as follows.

EXAMPLE 1

For the inorganic pillar forming the inorganic compound 16, a 10 weight % aqueous solution of silica sol as a colloidal inorganic compound (product name SNOWTEX OXS' manufactured by a Japanese corporation NISSAN KAGAKU KOGYO K. K., having an average grain size of 60Å) was employed. A 25 weight % aqueous solution of $TiCl_4$ as the cationic inorganic compound was added thereto and mixed sufficiently to cause reaction there between, and a reaction solution in which reaction products were dispersed was obtained. The composition ratio (in mol ratio) of silica sol and $TiCl_4$, as converted into $SiO_2$ and $TiO_2$, was $SiO_2$: $TiO_2$ = 10:1.

With this reaction solution, octadecyl trimethyl ammonium chloride as the quarternary ammonium compound (product name NISSAN CATION AB manufactured by a Japanese corporation NIPPON YUSHI K. K.) was mixed sufficiently, and a solution was obtained. This solution was mixed with a 0.8 weight % aqueous solution of preliminarily swelled Na-montmorillonite (product name KUNIPIA F of Japanese corporation KUNIMINE KOGYO K. K.) which is the swelling inorganic layered compound, and an intercalation reaction was performed at a temperature of 60° C. for 1.5 hours. The mixture was dehydrated through centrifugal separation. Thereafter the residual inorganic layered compound was orientated with a spatula into a sheet shape, which was dried for one day at room temperature. A warm-air drying was then performed at a temperature of 60° C., in which the sheet-shaped inorganic layered compound was placed within an electric furnace to be calcined at a temperature of 450° C., and a sheet-shaped sample of the inorganic, porous layered member of a thickness of 1.5 mm was obtained.

In the present Example, the composition ratio of Na-montmorillonite, $SiO_2$, $TiO_2$ and quarternary ammonium salt was 1:0.6:0.08:1 by weight.

EXAMPLE 2

Ethyl alcohol was added to $Si(OC_2H_5)_4$ as the metallic alcoholate A, and the two were sufficiently mixed to be a solution. 2N hydrochloric acid was then added to this solution, and a hydrolysis reaction was performed while heating to a temperature of 70° C., to prepare cores of the inorganic pillar. A 4M aqueous solution of $TiCl_4$ as the cationic inorganic compound was added to this reaction solution and mixed sufficient to obtain a reaction solution in which the reaction product obtained through this reaction was dispersed.

With respect to this reaction solution, the intercalation step into the swelling inorganic layered compound, sheet-shaped orientating step, drying step and calcination step were performed in the same manner as in the foregoing Example 1, and a sheet-shaped sample of the inorganic, porous layered member was obtained.

In the present Example, the composition ratio of $Si(OC_2H_5)_4$, ethyl alcohol, 2N hydrochloric acid and $TiCl_4$ was 17:18:65:1.7 in moles.

EXAMPLE 3

Except that, in place of $TiCl_4$, a solution of $Ti(OC_3H_7)_4$ as the metallic alcoholate B was dehydrolyzed with 2N hydrochloric acid, a sheet-shaped sample of the inorganic porous layered member was obtained through the same steps as in Example 1.

In the present Example, the composition ratio of Ti and hydrochloric acid was 0.07:1 by weight.

EXAMPLE 4

Except that, in place of the quarternary ammonium salt, an amphoteric surface-active agent (product name LIPOMIN, manufactured by Japanese corporation LION YUSHI K. K.) was employed, a sheet-shaped sample of the inorganic porous layered member was obtained through the same steps as in Example 1.

EXAMPLE 5

Except for the use of a synthetic mica (product name DIMONITE HG, manufactured by Japanese corporation TOPY KOGYO K. K.) in place of Na-montmorillonite as the swelling inorganic layered compound, a sheet-shaped sample of the inorganic porous layered member was obtained through the same steps as in Example 1.

EXAMPLE 6

Except for a use of $Al(OC_3H_7)_3$ in place of $Si(OC_2H_5)_4$ as the metallic alcoholate A, a sheet-shaped sample of the inorganic porous layered member was obtained through the same steps as in Example 2 as well as Example 1.

EXAMPLE 7

As the inorganic pillar forming the inorganic compound 16, a 20 weight % aqueous solution of silica sol as a colloidal inorganic compound (product name SNOWTEX OXS, average grain size of 60Å, by the Japanese corporation NISSAN KAGAKU KOGYO K. K.) was used, a 20 weight % aqueous solution of $TiO_2$ as the cationic inorganic compound was added thereto and sufficiently mixed, and a reaction solution was obtained in which reaction products generated by the thus performed reaction were dispersed.

Separately therefrom, Na-montmorillonite as the swelling inorganic layered compound was preliminarily made to swell with water, the foregoing inorganic pillar reaction solution was added and an intercalation reaction was performed at a temperature of 60° C. for 50 minutes. An aqueous solution of polyvinyl alcohol (molecular weight 22,000, hereinafter referred to simply as "PVA") as the water-soluble high polymer was added and mixed to generate the intercalation reaction. With respect to this intercalation reaction solution, the same sheet-shaped orientating, drying and calcining steps as in Example 1 were performed, and a sheet-shaped sample of the inorganic porous layered member having a thickness of 3 mm was obtained.

In the present Example, the composition ratio of Na-montmorillonite, PVA, water, silica sol and $TiO_2$ was, by weight, 1:1:125:0.6:0.08.

EXAMPLE 8

A sheet-shaped sample of the inorganic porous layered member was obtained through the same steps as in Examples 7 and 1, except that $Ti(OC_3H_7)_4$ was used as the metallic alcoholate B, instead of $TiCl_4$, and 2N hydrochloric acid was added in a ratio of 14:1 by weight.

EXAMPLE 9

A sheet-shaped sample of the inorganic porous layered member was obtained through the same steps as in Examples 7 and 1, except that two types of PVA as the soluble high polymer were used in one of molecular weight 22,000 and the other of 88,000, octadecyl trymethyl ammonium chloride was used as the quarternary ammonium salt, and a 10 weight % aqueous solution of silica sol preliminarily modified with an ammonium ion (product name SNOWTEX QXS, average grain size of 60Å, by the Japanese corporation NISSAN KAGAKU KOGYO K. K.) was used as the colloidal inorganic compound.

In the present Example, the composition ratio by weight of Na-montmorillonite, PVA, cotadecyl trimethyl ammonium chloride, water and silica sol was 1:0.5:0.5:125:0.6, the composition ratio of silica sol and $TiCl_4$ was 10:1 in moles, and the ratio between PVA of molecular weight 22,000, PVA of molecular weight 88,000 and octadecyl trimethyl ammonium chloride was 0.5:0.25:0.25 by weight.

EXAMPLE 10

A sheet-shaped sample of the inorganic porous layered member was obtained through the same steps as in Examples 7 and 1, except that PVA of molecular weight 22,000 was used, and that, as the inorganic pillar, 25 weight % of a composition of $Ti(OC_3H_7)_4$ as the metallic alcoholate B and 2N hydrochloric acid in a weight ratio of 14:1 was added to a 10 weight % aqueous solution of $SnO_2$ sol (a product by the Japanese corporation NISSAN KAGAKU KOGYO K. K. of average grain size 80Å).

In the present Example, the composition ratio of Na-montmorillonite, PVA, water, $SnO_2$ sol, $Ti(OC_3H_7)_4$ and 2N hydrochloric acid solution was 1:1:125:0.6:0.08:1 by weight.

COMPARATIVE EXAMPLE 1

As the colloidal inorganic compound, 20 weight % of colloidal silica (product name SNOWTEX XS, average grain size 130Å by the Japanese corporation NISSAN KAGAKU KOGYO K. K.) was employed, and Na-montmorillonite was used as the swelling inorganic layered compound. The foregoing were mixed with polyethylene oxide (product name ALKOX E75 of average molecular weight 1,500,000 to 2,200,000 by Japanese corporation MEISEI KAGAKU K. K.), as the water-soluble high polymer, and water at a temperature of 70° C. for 40 minutes. This mixture was oriented by means of a spatula into a sheet shape, and subjected, after being dried, to a calcination performed at a temperature of 400° C. for 2 hours, thereby to obtain a sheet-shaped sample of an inorganic porous layered member.

In the present Example, the composition ratio of Na-montmorillonite, water, colloidal silica and polyethylene oxide was 1:10:3:0.1 by weight.

Measurement of the porosity, average distance between the layers, heat conductivity and density has been made with respect to the sheet-shaped samples of the inorganic porous layered member obtained through the above described Examples and Comparative Example, the results of which are shown in the following Table. In this Table, the measurement of the heat conductivity and density of a gypsum board as Comparative Example 2, and of a sand mold as Comparative Example 3 is also shown.

In carrying out the measurements, the Opened-Layer Ratio has been calculated according to the following formula:

$$\text{Opened-Layer Ratio} = \frac{\left(\begin{array}{c}\text{surface}\\\text{area of the}\\\text{sample}\end{array}\right) - \left(\begin{array}{c}\text{surface area}\\\text{of inorganic}\\\text{compound}\\\text{between}\\\text{the layers}\end{array}\right) - \left(\begin{array}{c}\text{outer surface}\\\text{area of}\\\text{layered compound}\\\text{in the sample}\end{array}\right)}{\left(\begin{array}{c}\text{weight of the}\\\text{layered compound}\\\text{in the sample}\end{array}\right) \times \left(\begin{array}{c}\text{theoretical specific surface}\\\text{area of the layered compound}\\\text{with all layers made porous}\end{array}\right)}$$

In the above, the specific surface area and average distance between the layers have been obtained by employing BET method in the nitrogen adsorbing method and CI method in the nitrogen adsorbing method, respectively. For a nitrogen adsorbing device to be employed in the nitrogen adsorbing method, "AUTO-SORB 6" of the U.S. corporation Quanta Chrome has been utilized. In measuring the heat conductivity, a heat conductivity measuring device according to Xenon-flush method has been employed.

| System | Opened-Layer Ratio | Average Distance Between Layers (Minimum) Å | Heat Conductivity Kcal/mhr °C. | Density g/cm³ |
|---|---|---|---|---|
| Example No. | | | | |
| 1 Na-montmorillonite + Silica sol + $TiCl_4$ + $C_{18}H_{37}N(CH_3)_3Cl$ | 0.49 | 40 (30) | 0.042 | 120 |
| 2 Na-montmorillonite + $Si(OC_2H_5)_4$ + $TiCl_4$ + $C_{18}H_{37}N(CH_3)_3Cl$ | 0.53 | 40 (30) | 0.036 | 1.18 |
| 3 Na-montmorillonite + | 0.47 | 40 | 0.041 | 1.19 |

-continued

| | System | Opened-Layer Ratio | Average Distance Between Layers (Minimum) Å | Heat Conductivity Kcal/ mhr °C. | Density g/cm³ |
|---|---|---|---|---|---|
| | silica sol + Ti(OC₃H₇)₄ + C₁₈H₃₇N(CH₃)₃CL | | (30) | | |
| 4 | Na-montmorillonite + silica sol + TiCl₄ + amphoteric surface-active agent | 0.49 | 40 (30) | 0.039 | 1.18 |
| 5 | Synthetic mica + silica sol + TiCl₄ + C₁₈H₃₇N(CH₃)₃Cl | 0.49 | 40 (30) | 0.040 | 1.21 |
| 6 | Na-montmorillonite + Al(OC₃H₇)₃ + Ti(OC₃H₇)₄ + C₁₈H₃₇N(CH₃)₃Cl | 0.55 | 40 (30) | 0.042 | 1.22 |
| 7 | Na-montmorillonite + TiCl₄ + PVA + silica sol | 0.49 | 45 (30) | 0.046 | 1.09 |
| 8 | Na-montmorillonite + Ti(OC₃H₇)₄ + PVA + Silica sol | 0.50 | 45 (30) | 0.047 | 1.08 |
| 9 | Na-montmorillonite + PVA(M:22000) + PVA(M:88000)TiCl₄ + C₁₈H₃₇N(CH₃)₃Cl + silica sol | 0.53 | 45 | 0.037 | 1.10 |
| 10 | Na-montmorillonite + Ti(OC₃H₇)₄ + PVA(M:22000) + SnO₂sol | 0.53 | 45 (30) | 0.043 | 1.10 |
| Comparative Example No. | | | | | |
| 1 | Na-montmorillonite + silica sol + polyethylene oxide | 0.26 | — | 0.079 | 1.21 |
| 2 | Gypsum board | — | — | 0.13 | 0.70 |
| 3 | Sand mold | — | — | 0.25 | 1.50 |

We claim:

1. A method for manufacturing an inorganic porous layered member wherein a swelling inorganic layered compound is swelled, and a pillar is intercalated between layers of the inorganic layered compound and dried to form fine gaps between the layers, and further wherein at least one inorganic pillar and at least one organic pillar are intercalated, said at least one inorganic pillar being obtained by carrying out a surface modification with at least one of cationic inorganic compound and metallic alcoholate in which said surface is positively charged or has its negative charge cancelled prior to said at least one inorganic pillar and said at least one organic pillar being intercalated.

2. A method according to claim 1, wherein the inorganic pillar (16) before being modified is at least one of colloidal inorganic compound and a hydrolysis product of the metallic alcoholate.

3. A method according to claim 1, wherein the organic pillar (22) is at least one of water-soluble high polymer, quarternary ammonium salt, amphoteric surface-active agent and choline compound.

4. A method according to claim 1, wherein a calcining step is further carried out after the drying.

5. A method according to claim 1, wherein the gaps formed between the layers (14) is made to be 30 to 600Å in more than 40% of the whole of the inorganic porous layered member (10).

6. A method according to claim 1, wherein the inorganic layered compound (12) is at least one selected from a group consisting of Na-montmorillonite, Ca-montmorillonite, acid clay, 3-octahedron synthetic smectite, Na-hectorite, Li-hectorite, Na-taeniolite, Li-taeniolite and Na-Fluoro-Tetrasilicmica.

7. A method according to claim 1, wherein the cationic inorganic compound is at least one selected from a group consisting of a titanium compound, zirconium compound, hafnium compound, iron compound, copper compound, chromium compound, nickel compound, zinc compound, aluminium compound, manganese compound, phosporus compound and boron compound.

8. A method according to claim 1, wherein the metallic alcoholate forming the inorganic pillar is at least one selected from a group consisting of Ti(OR)₄, Zr(OR)₄, PO(OR)₃ and B(OR)₃.

9. A method according to claim 2, wherein the metallic alcoholate forming the inorganic pillar is at least one selected from a group consisting of Si(OR)₄, Al(OR)₃ and Ge(OR)₄.

10. A method according to claim 2, wherein the colloidal inorganic compound is at least one selected from a group consisting of SiO₂, Sb₂O₃, Fe₂O₃, Al₂O₃, TiO₂ ZrO₂ and SnO₂.

11. A method according to claim 3, wherein the water-soluble high polymer is at least one selected from a group consisting of polyvinyl alcohol, polyethylene glycol, polyethylene oxide, methyl cellulose, carboxymethyl cellulose, polyacrylic acid, polyacrylic soda and polyvinyl pyrrolidone.

12. A method according to claim 3, wherein the quarternary ammonium salt is at least one selected from a group consisting of octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt and ditetradecyl dimethyl ammonium salt.

13. A method according to claim 3, wherein the choline compound is at least one selected from a group consisting of [HOCH$_2$CH$_2$N(CH$_3$)$_3$]$^+$OH$^-$, C$_5$H$_{14}$ClNO, C$_5$H$_{14}$NOC$_4$H$_5$O$_6$, C$_5$H$_{14}$NOC$_6$H$_7$O$_7$ and C$_5$H$_{14}$NOC$_6$H$_{12}$O$_7$.

14. A method according to claim 3, wherein the amphoteric surface-active agent is one which is, in the cationic part, of aliphatic amine type and, in the anionic part, provided with at least one group selected from a group consisting of carboxyl group, sulfate group, sulfone group and phosphate group.

15. A method according to claim 2, wherein the organic pillar is at least one of water-soluble high polymer, quarternary ammonium salt, amphoteric surface-active agent and choline compound.

16. A method according to claim 2, wherein a calcining step is further carried out after the drying.

17. A method according to claim 3, wherein a calcining step is further carried out after the drying.

18. A method according to claim 2, wherein the gaps formed between the layers is made to be 30 to 600Å in more than 40% of the whole of the inorganic porous layered member.

19. A method according to claim 3, wherein the gaps formed between the layers is made to be 30 to 600Å in more than 40% of the whole of the inorganic porous layered member.

20. A method according to claim 4, wherein the gaps formed between the layers is made to be 30 to 600Å in more than 40% of the whole of the inorganic porous layered member.

21. A method according to claim 2, wherein the inorganic layered compound is at least one selected from a group consisting of Na-montmorillonite, Ca-montmorillonite, acid clay, 3-octahedron synthetic smectite, Na-hectorite, Li-hectorite, Na-taeniolite, Li-taeniolite and Na-Fluoro-Tetrasilicmica.

22. A method according to claim 3, wherein the inorganic layered compound is at least one selected from a group consisting of Na-montmorillonite, Ca-montmorillonite, acid clay, 3-octahedron synthetic smectite, Na-hectorite, Li-hectorite, Na-taeniolite, Li-taeniolite and Na-Fluoro-Tetrasilicmica.

23. A method according to claim 4, wherein the inorganic layered compound is at least one selected from a group consisting of Na-montmorillonite, Ca-montmorillonite, acid clay, 3-octahedron synthetic smectite, Na-hectorite, Li-hectorite, Na-taeniolite, Li-taeniolite and Na-Fluoro-Tetrasilicmica.

24. A method according to claim 5, wherein the inorganic layered compound is at least one selected from a group consisting of Na-montmorillonite, Ca-montmorillonite, acid clay, 3-octahedron synthetic smectite, Na-hectorite, Li-hectorite, Na-taeniolite, Li-taeniolite and Na-Fluoro-Tetrasilicmica.

25. A method according to claim 2, wherein the cationic inorganic compound is at least one selected from a group consisting of a titanium compound, zirconium compound, hafnium compound, iron compound, copper compound, chromium compound, nickel compound, zinc compound, aluminum compound, manganese compound, phosphorus compound and boron compound.

26. A method according to claim 3, wherein the cationic inorganic compound is at least one selected from a group consisting of a titanium compound, zirconium compound, hafnium compound, iron compound, copper compound, chromium compound, nickel compound, zinc compound, aluminum compound, manganese compound, phosphorus compound and boron compound.

27. A method according to claim 4, wherein the cationic inorganic compound is at least one selected from a group consisting of a titanium compound, zirconium compound, hafnium compound, iron compound, copper compound, chromium compound, nickel compound, zinc compound, aluminum compound, manganese compound, phosphorus compound and boron compound.

28. A method according to claim 5, wherein the cationic inorganic compound is at least one selected from a group consisting of a titanium compound, zirconium compound, hafnium compound, iron compound, copper compound, chromium compound, nickel compound, zinc compound, aluminum compound, manganese compound, phosphorus compound and boron compound.

29. A method according to claim 6, wherein the cationic inorganic compound is at least one selected from a group consisting of a titanium compound, zirconium compound, hafnium compound, iron compound, copper compound, chromium compound, nickel compound, zinc compound, aluminum compound, manganese compound, phosphorus compound and boron compound.

30. A method according to claim 2, wherein the metallic alcoholate forming the inorganic pillar is at least one selected from a group consisting of Ti(OR)$_4$, Zr(OR)$_4$, PO(OR)$_3$ and B(OR)$_3$.

31. A method according to claim 3, wherein the metallic alcoholate forming the inorganic pillar is at least one selected from a group consisting of Ti(OR)$_4$, Zr(OR)$_4$, PO(OR)$_3$ and B(OR)$_3$.

32. A method according to claim 4, wherein the metallic alcoholate forming the inorganic pillar is at least one selected from a group consisting of Ti(OR)$_4$, Zr(OR)$_4$, PO(OR)$_3$ and B(OR)$_3$.

33. A method according to claim 5, wherein the metallic alcoholate forming the inorganic pillar is at least one selected from a group consisting of Ti(OR)$_4$, Zr(OR)$_4$, PO(OR)$_3$ and B(OR)$_3$.

34. A method for manufacturing an inorganic porous layered member wherein a swellable inorganic layered compound is swelled, and a plurality of pillars are intercalated between layers of said inorganic layered compound and dried to form fine gaps between the layers of from about 30 to about 600Å in greater than 40% of the whole of said inorganic porous layered member, and wherein said plurality of pillars comprises at least one organic pillar and at least one inorganic pillar obtained by carrying out a surface modification with at least one of metallic alcoholate and cationic inorganic compound in which said surface is positively charged or has its negative charge cancelled prior to said pillars and said layers of inorganic layered compound being intercalated.

* * * * *